United States Patent [19]

Nakazawa et al.

[11] Patent Number: 5,397,386
[45] Date of Patent: Mar. 14, 1995

[54] WATER-SOLUBLE INK, INK JET PRINTER AND METHOD OF PRINTING THEREOF

[75] Inventors: Chiyoshige Nakazawa; Youichi Kubomura; Shigeo Sugimura, all of Suwa, Japan

[73] Assignee: Seiko Epson Corporation, Tokyo, Japan

[21] Appl. No.: 205,216

[22] Filed: Mar. 2, 1994

[30] Foreign Application Priority Data

Mar. 9, 1993 [JP] Japan ................. 5-048227

[51] Int. Cl.⁶ .......................................... C09D 11/02
[52] U.S. Cl. ................................................ 106/22 K
[58] Field of Search ................. 106/22 K, 20 D, 22 R

[56] References Cited

U.S. PATENT DOCUMENTS

| | | | |
|---|---|---|---|
| 4,153,593 | 5/1979 | Zabiak et al. | 106/22 B |
| 4,170,482 | 10/1979 | Mansukhani | 106/22 B |
| 4,184,881 | 1/1980 | Bradley | 106/20 B |
| 4,196,007 | 4/1980 | Mansukhani | 106/22 B |
| 4,299,630 | 11/1981 | Hwang | 106/22 H |
| 4,388,115 | 6/1983 | Sugiyama et al. | 106/22 |
| 4,512,807 | 4/1985 | Ogawa et al. | 106/22 |
| 4,957,553 | 9/1990 | Koike et al. | 106/22 H |
| 5,196,057 | 3/1993 | Escano et al. | 106/22 R |

FOREIGN PATENT DOCUMENTS

| | | |
|---|---|---|
| 320223 | 6/1989 | European Pat. Off. |
| 453578 | 10/1991 | European Pat. Off. |
| 6752 | 2/1983 | Japan |
| 111749 | 5/1987 | Japan |
| 123752 | 5/1989 | Japan |
| 252680 | 10/1989 | Japan |
| 151674 | 6/1990 | Japan |
| 175383 | 6/1992 | Japan |
| 183759 | 6/1992 | Japan |
| 183760 | 6/1992 | Japan |
| 183761 | 6/1992 | Japan |
| 339664 | 11/1992 | Japan |
| WO9107282 | 5/1991 | WIPO |

Primary Examiner—Helene Klemanski
Attorney, Agent, or Firm—Eric B. Janofsky

[57] ABSTRACT

A plastic ink jet recording head is provided utilizing a water-soluble ink comprised of water-soluble dye having the chemical structure of:

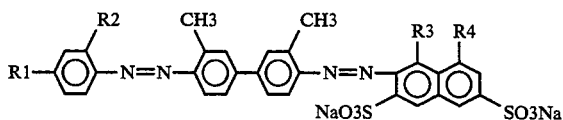

The ink composition comprises a surfactant in the range 0.01 wt. to 0.1 wt. of having an acetylene glycol surfactant having a chemical structure of:

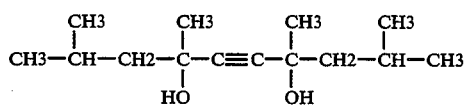

and an acetylene glycol-ethylene oxide adduct is provided having a chemical of:

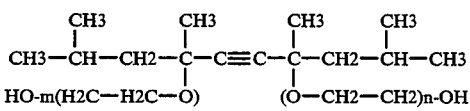

wherein m and n are each integers of at least 1.

15 Claims, 13 Drawing Sheets

PRIOR ART

WATER-SOLUBLE INK, INK JET PRINTER AND METHOD OF PRINTING THEREOF

FIELD OF INVENTION

The present invention relates to a water soluble ink used in on-demand type ink jet printers for use in, for example, computer systems, electric calculators, cash registers, automated teller machines (ATM), facsimile apparatuses and the like. More particularly, the present invention relates to an ink jet printer having an ink jet head composed of a plastic material using such water soluble ink.

BACKGROUND OF THE INVENTION

On-demand type ink jet printers are used in, for example, computer systems, electric calculators, cash registers, automated teller machines (ATM), facsimile apparatuses and the like. In an ink jet printer, ink droplets are ejected or jetted to a recording sheet to form letters, figures, or pictures thereon in accordance with a predetermined dot matrix. That is, typical ink jet printing systems consists basically of forming a letter or a figure on a recording medium by ejecting droplets through at least one small nozzle in a preselected arrangement. These ink droplets can be formed by, for example, electrostatic charging, application of thermal energy or application of mechanical energy. One known device for supplying mechanical energy is the piezoelectric device.

It is advantageous that an ink jet printer have the following characteristics for use as a high quality printer in the aforementioned devices:

1. The ink must be consistently discharged by the ink jet printer through each selected nozzle without any clogging during prolong continuous operation. A clogged nozzle can result in misformed or unformed characters.
2. The printer must be free of meandering flying of ink drops. In other words, the ink drops must be printed in their respective desired locations. Otherwise, characters may be distorted or misformed.
3. The ink must dry immediately after printing to prevent smudging and smearing.
4. The printer must consume a minimal amount of electrical energy.
5. The printer must have a small size.
6. The printer must be inexpensive to maintain and manufacture.

It has been proposed to provide an ink jet or recording head, including the supply passage ways and the ink tank, composed of a plastic material. A plastic ink head can be fabricated by means of, for example, molding and welding of performed plastic pieces. These processes are well known for inexpensively and reliable fabricating such recording heads. Additionally, plastic possesses superior chemical resistance. In view of the above, plastic is a very desirable material for use as an ink jet head.

However, conventional techniques do not provide for a plastic ink jet head which can print images and characters with high quality. This can be explained as follows. Plastics generally do not have characteristics of affinity for water or good water characteristics. In other words, plastics can hardly be wetted by water or ink having water soluble dye. As such, passage ways fabricated in the ink plastic head are hardly wetted with the ink so that bubbles may be formed therein. The bubbles absorb the forced generated by the pressure elements of the ink jet head which reduces displacement thereof so that the power of the ink ejection is attenuated. This reduction causes missing dots and or smaller dot size. Additionally it is difficult to wet the circumference of an orifice of the nozzle so that the meandering of ink ejection and deformation by the printer printed characters still exists.

The inventors note that surfactants generally roughen the surface of plastic materials. However, the selection of suitable plastics in printing heads using a surfactant-containing ink character has been troublesome.

All the while, each of the above points may have been individually addressed by conventional inks and ink jet printers, the inventors are not aware of any means or device which satisfies each and every one of these characteristics, as explained in detail below Various attempts have been made to provide an ink jet printer which satisfied the above-mentioned characteristics. But none of these attempts overcame the problems for an ink jet printer with a plastic print head.

For example, Japanese Patent Application Laid Open No. 1-123752, which address points number 1 and 2 above, is directed to a technique of wetting an ink flow pathway from an ink reservoir to a nozzle surface of a recording head in order to obtain uniform wetting of this nozzle surface of the recording head. This technique is accomplished by preventing the generation of bubbles in the ink. More specifically, grooves are arranged symmetrically to the series of nozzle orifices for jetting out the ink there through. The edge of such nozzles are made of Ni, Ti, Si, $O_2$, Ti, $O_2$ or the like. Alternatively, the nozzle maybe surfaced-treated by plating, vapor deposition, sputtering or some other coating means. However, the technique discussed in Japanese Patent Application Laid Open No. 1-123752 requires the additional step of forming the head. This additional step increases the unit price of such products. In addition, in accordance with the above-mentioned coating means, it is difficult to completely and uniformly coat the nozzle surface. As a result, the surface of the nozzle edge has a portion which can be wetted with ink and a portion that is not wetted. This configuration causes the jetting direction of the ink drops to meander and, as such, the printed letters or characters have a tendency to be deformed.

Japanese Patent Application Laid Open No. 62-111749 is directed to a printer having a heater-combined hot air blowing unit to promote the drying of the printed ink. This is accomplished by blowing hot air on the just ejected ink. However, such a device is intended to be used in large-scale printers, since this device consumes an inordinate amount of electric power. Additionally, the cost of such devices are high. As such, the device discussed in Japanese Patent Application Laid Open No. 62-111749 is not particularly well suited for the applications discussed above.

Japanese Patent Application Laid Open No. 1-252680 and its European counterpart application 320,223 propose the addition of more than 40 wt. % of a wetting agent and a nonionic acetylene diol surfactant or dioctyl sulfocuccinate surfactant intended for the prevention of the clogging of the print head for the smooth operation of printing on plain paper.

The ink composition comprises a compatible dye, greater than 40 weight % humectant and a surfactant.

The surfactant is utilized to facilitate printing on plain paper. In these references the weight % is based on the total ink composition. In this ink composition, the high amounts of humectant are said to be selected to insure that the viscosity of the ink is maintained between about 5.5 and 6.5 centipoise. This reference specifies a dye comprising a liquid mixture of Liquid Blue C.I. 279 and mixed with Direct Red C.I. 236 and Direct Yellow C.I. 107, in the ratio of 3.53/1.35/1.0, and Mobay Special Black SP liquid ink and discusses the use of the following surfactants:

Surfynol GA-1 to 10 weight %
Surfynol 82-10 weight %
Surfynol 465-1 to 10 weight %
Surfynol 485-5 to 10 weight %
Surfynol 136-2 weight %

These documents are silent as to the material employed in the print head. Accordingly, this reference fails to appreciate the problems associated with plastic print heads. Therefore, this reference could not attempt to propose solutions for solving the problems discussed above.

Further, Japanese Patent Publication No. 58-6752 proposes the addition of a tertiary alcohol-ethylene oxide adduct having a chemical structure as follows:

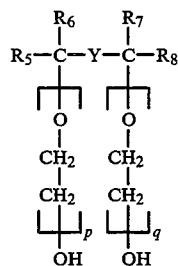

$R_5$–$R_8$ each present alkyl group, p and q each represents an integer of at least one and Y represents an acetylene group.

The addition of such adduct is said to improve the smooth operation of printing with the ink on plain papers including the stability of the ink to resist smearing and running.

Where the techniques of Japanese Patent Application Laid Open No. 1-252680 and Japanese Patent Publication No. 58-6752 are employed, the time for drying the printed ink is said to be shortened by some degree. Thus, printing on plain paper is said to be possible without enlarging the scale of the printer. Additionally, the clogging of the ink jet is said to be prevented as the storage stability and the water-proofness of the ink being used is said to be improved. However, these references do not address the problems of prevent missing dots of a desired matrix of dots and the meandering of ink drops.

OBJECTS OF THE INVENTION

It is the object of the present invention to provide a printing apparatus, method of printing, a water soluble ink that obviates the aforementioned problems in the ink jet printer.

It is the further object of the present invention to provide an ink jet printer having a compact plastic print head which can be manufactured inexpensively.

It is an additional object of the present invention to provide a printer which can print reliably having high quality without any deformed characters.

It is still another object of the present invention to provide a water soluble ink which can be used in printing a high-density print image.

It is still yet a further object of the present invention to provide a water soluble ink void of bubbles and which may be easily de-foamed in any de-foaming step.

It is still yet a further object of the present invention to provide an ink having high storage stability over an extended period of time.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

SUMMARY OF THE INVENTION

According to an aspect of the present invention, a water-soluble ink and an ink jet printer capable of printing images having good water-proofness characteristics and an aqueous ink composition comprised of water-soluble dye having the chemical structure of:

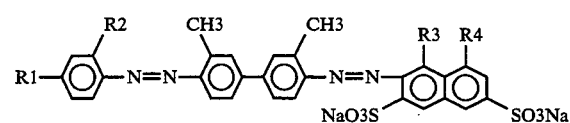

where $R_1$ to $R_4$ each represent either an OH group or an $NH_2$ group in the range of about 0.1 wt. % to 10.0 wt. % of the aqueous ink.

The ink composition comprises surfactant in the range 0.01 wt. % to 0.1 wt. % of having an acetylene glycol surfactant having a chemical structure of:

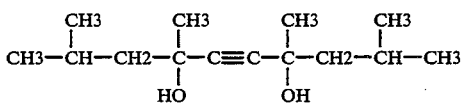

and an acetylene glycol-ethylene oxide adduct is provided having a chemical structure of

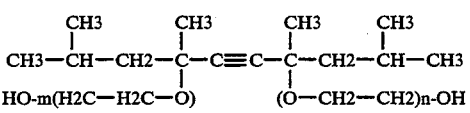

wherein m and n are each integers of at least 1.

According to another aspect of the present invention, an aqueous ink composition is provided having high wettability to plastic surfaces in contact with the ink comprising a water-soluble dye having the chemical structure formula as follows:

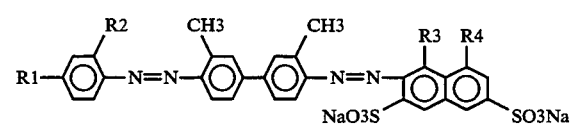

wherein $R_1$ to $R_4$ each represents either an OH group or an $NH_2$ group and comprises an amount in the range 0.1 wt. % to 10.0 wt. % of the ink. The ink composition further comprises at least one of a first, second or third surfactant. The first surfactant is in the range of 0.01 wt. % to 0.1 wt. % of the ink and comprises acetylene glycol surfactant having a chemical structure formula of:

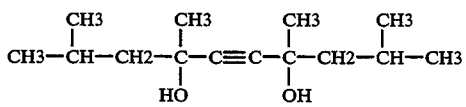

The second surfactant is an acetylene glycol-ethylene oxide adduct surfactant in the range of about 0.01 wt. % to 0.1 wt. % of the aqueous ink and comprises a chemical structure formula as follows:

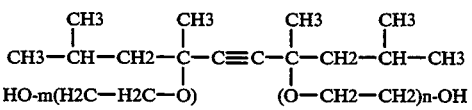

wherein the sum of m and n is in the range of 1–5. The third surfactant is in the range of 0.1 wt. % to 10 wt. % by weight of the ink and comprises acetylene glycol-ethylene oxide adduct surfactant having a chemical formula of

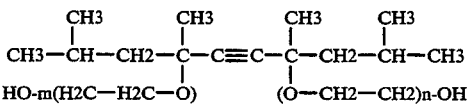

wherein the sum of n and m is in the range of 6–40.

In accordance with still another aspect of the present invention an ink jet printer comprises a plastic molded body and an utilizes an aqueous ink composition as described above.

Other objects and attainments together with the full understanding of the invention will become apparent and appreciated by referring to the following description and claims taken in conjunction with the accompanying drawings.

BRIEF DESCRIPTION OF DRAWINGS

In the drawings, wherein like referenced characters denote some elements throughout the several views.

A DESCRIPTION OF THE PREFERRED EMBODIMENTS

Figure 1:
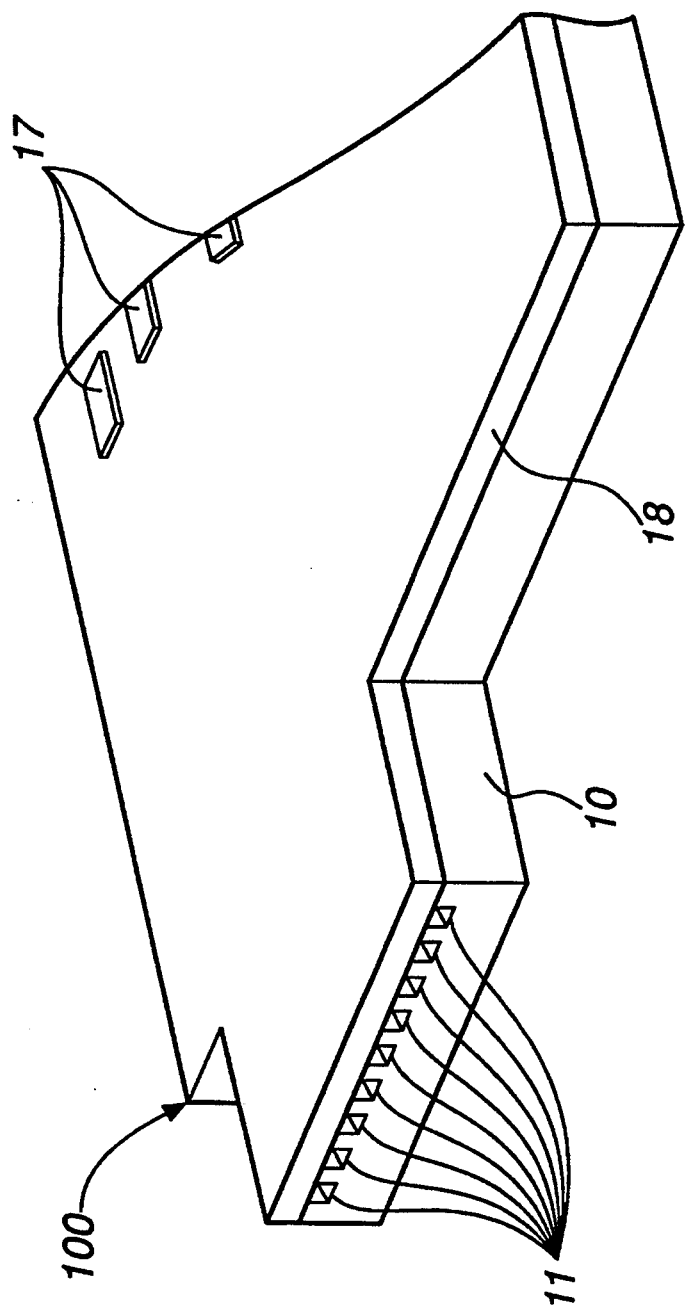
FIG. 1 is a partial perspective view of a recording head in accordance with the present invention.
Figure 2:
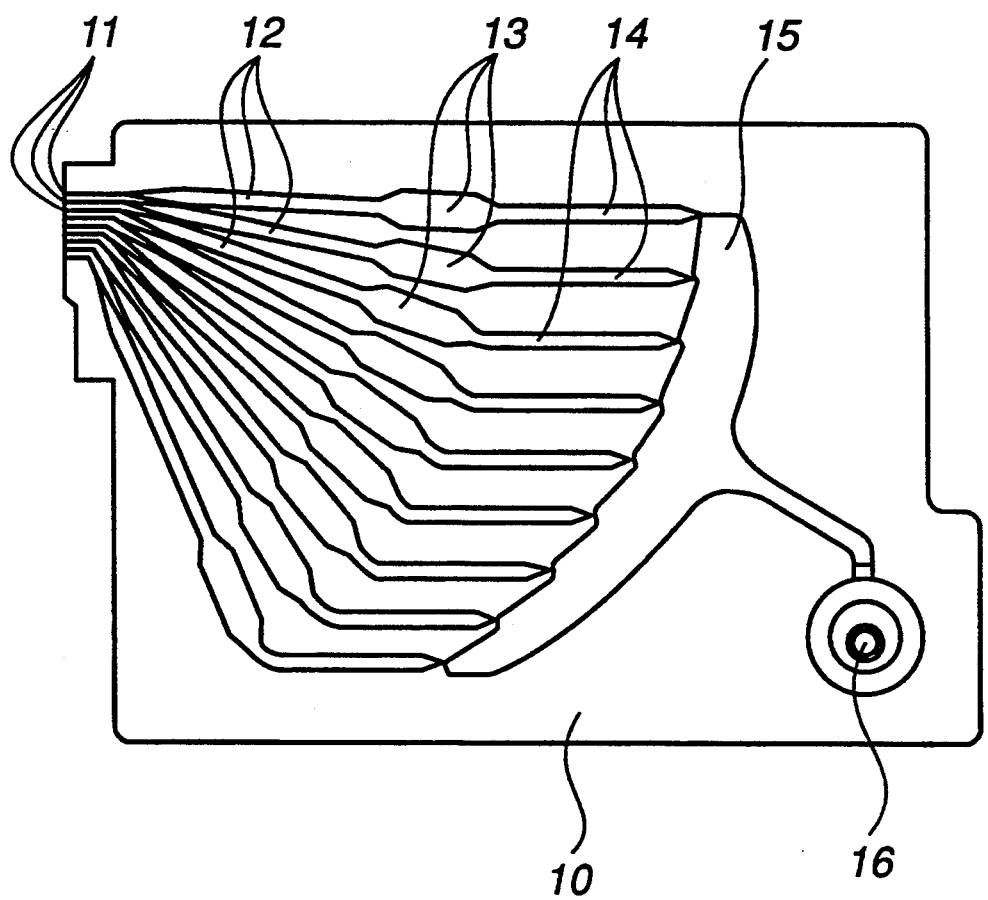
FIG. 2 is a cross-sectional view of a first base portion of the recording head of FIG. 1.
Figure 3:
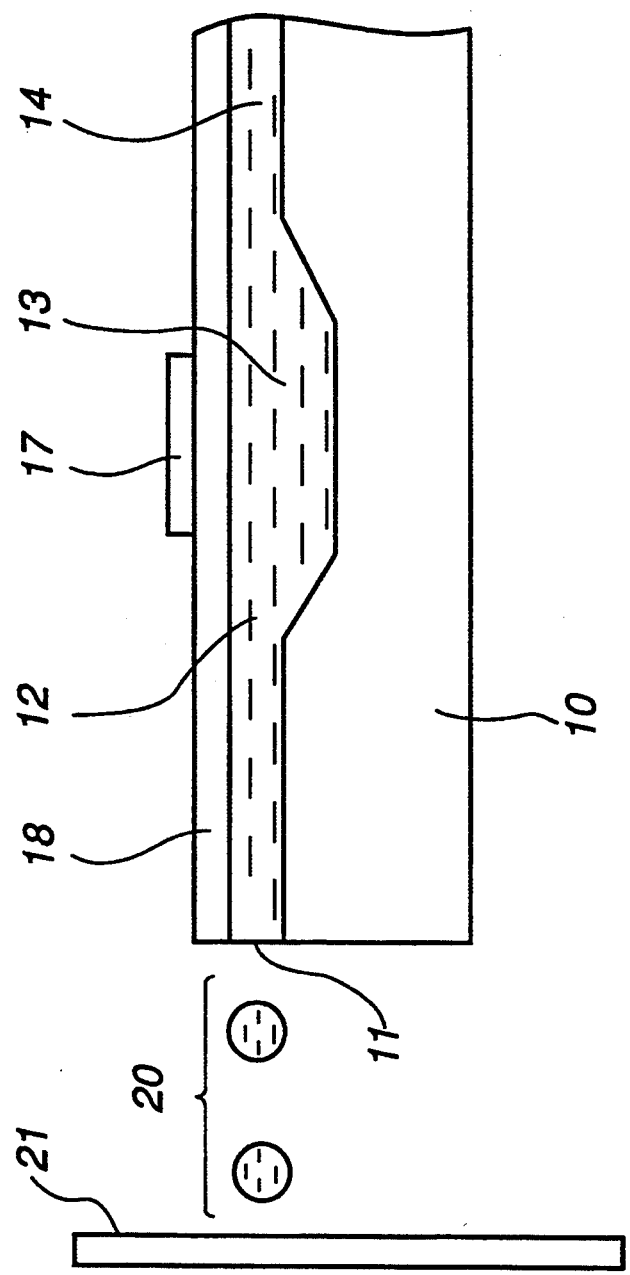
FIG. 3 is a partial cross-sectional view of the recording head of FIG. 1.

According to FIGS. 1–3, a preferred example of a recording head, generally referred to by 100, according to the present invention is illustrated. The recording head comprises a first base 10, which is fabricated by shaping a plastic resin, by way of example, polysulfone, polycarbonate, polyether sulfone, polyallyl sulfone, polyacetal or the like by a process, such as molding or laser machining. As shown in FIG. 2, the recording head also comprises a common ink chamber 15 in communication with a plurality of ink flow pathways 14, respective pressure chambers 13, ink flow pathways 12 and nozzle orifices 11. In the preferred embodiment, the number of nozzle orifices is 9 having a pitch of 350 $\mu$m. The profile for each of the nozzle orifices 11 is, for example trapezoidal, having a dimension of 60 $\mu$m (minor edge)×70 $\mu$m (major edge)×30 $\mu$m (height). The ink flow pathways 12 and 13 are arranged on the nozzle side and the feed side of pressure chambers 13, respectively, and have been formed by, for example, engraving the first base 10 in a known manner. The recording head also comprises an ink feed mouth 16 for supplying ink to recording head 100. Turing back to FIG. 1, a second base 18 is further provided and adhered to base 10 by a conventional manner, such as fusion or with an adhesive, to form the ink flow pathways 12 and 14. Respective piezoelectric elements 17 are arranged on the second base 18 with, for example, an adhesive, and face corresponding pressure chambers 13 formed on first base 10. Referring specifically to FIG. 3, flying ink drops 20 are illustrated advancing toward recording medium 21.

The operation of the recording head 10 in an ink jet printer in accordance with the present invention is as follows. The ink is supplied to recording head 100 through ink feed mouth 16 and due to capillary action, pathways 12 and 14, and the chambers 13 are filled with the ink. Next an electrical signal is applied to the piezoelectric elements 17 in a conventional manner. Upon application of the electrical signal, the piezoelectric elements 17 are deformed to reduce the capacity of the corresponding pressure chambers 13, so that the ink drops 20 are jetted out to fly towards the recording medium 21. In the preferred embodiment the electrical signal to drive the selected piezoelectric elements is 35 volts at a frequency of 2.0 kHz, at room temperature. After the ink drops 20 have adhered to recording medium 21 and have been fixed thereon, recording is attained.

The basic composition of the water-soluble ink to be used in the following examples comprises a water-soluble dye and a solvent. As a water-soluble dye, the ink contains at least a compound having the following formula:

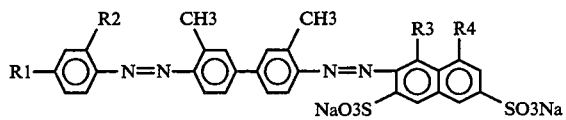

wherein $R_1$ to $R_4$ each represents an OH group or an $NH_2$ group. In the preferred embodiment the water-soluble ink comprises 0.1 wt. % of the water-soluble dye. Even when the water-soluble dye is combined with any other water-soluble dye in the ink, the content of the water soluble dye of the ink is at least 0.1 wt. %. The inventors have observed that a dye containing less than 0.1 wt. % does not print with a sufficient enough density to provide an acceptable output. On the other hand, if the water-soluble dye comprised more than 10 wt. %, precipitates are formed which tend to clog the nozzles of the recording head. As a result of these clogged nozzles, the printed output contains misformed and/or deformed characters, such that the output is unacceptable.

Next, examples of demonstrating printing operations with an ink jet printer equipped the recording head of the present invention as mounted therein, using the water-soluble ink of the present invention, will be discussed hereinbelow along with comparative examples. As shown in these examples, an ink composition in accordance with the present invention achieves significantly better results by which the effect of the present invention will be clarified concretely.

EXAMPLE 1

In accordance with the first embodiment of the present invention, the aqueous ink was constituted by the following components were blended, well stirred for dissolution, and filtered through a membrane filter having a pore size of 0.8 μm. The resulting filtrate was subject to a de-foaming operation. In the de-foaming operation, the filtrate was placed in a vacuum tank. For example, the vacuum tank was connected with a rotary pump via a tube, the inside of the tank was made vacuum by discharging the air therefrom. The contents in the tank was allowed to stand one hour under the condition to produce a water-soluble ink. During the de-foaming operation, the ink produced herein did not bubble and almost 100 % of the de-foamed ink was usable in the following tests.

TABLE 1

Colorant:
Dye having chemical structure of having the following formula:  5.0 wt. %

$$HO-\underset{NH_2}{\underset{|}{C_6H_3}}-N=N-\underset{CH_3}{\underset{|}{C_6H_3}}-\underset{CH_3}{\underset{|}{C_6H_3}}-N=N-\underset{NaO_3S}{\underset{|}{C_{10}H_4}}\underset{SO_3Na}{\overset{HO\ NH_2}{}}$$

Penetrating agent:
Surfactant having chemical structure of having the following formula:  5.0 wt. %

$$CH_3-\underset{CH_3}{\underset{|}{CH}}-CH_2-\underset{CH_3}{\underset{|}{C}}-C\equiv C-\underset{CH_3}{\underset{|}{C}}-CH_2-\underset{CH_3}{\underset{|}{CH}}-CH_3$$

HO—m(H2C—H2C—O)    (O—CH2—CH2)n—OH
wherein the molar number of ethylene oxide added (m + n) is from 6 to 40)

Antiseptic:
Compound having a chemcial structure of the following formula:

TABLE 1-continued

|  |  |
|---|---|
| (indoline-2-thione structure with C=O, NH, S) | 0.2 wt. % |
| Solvent: | |
| Polyethylene glycol | 10.0 wt. % |
| Water | 79.8 wt. % |

The water-soluble ink was fed into an ink jet printer as discussed hereinabove.

Figure 4:
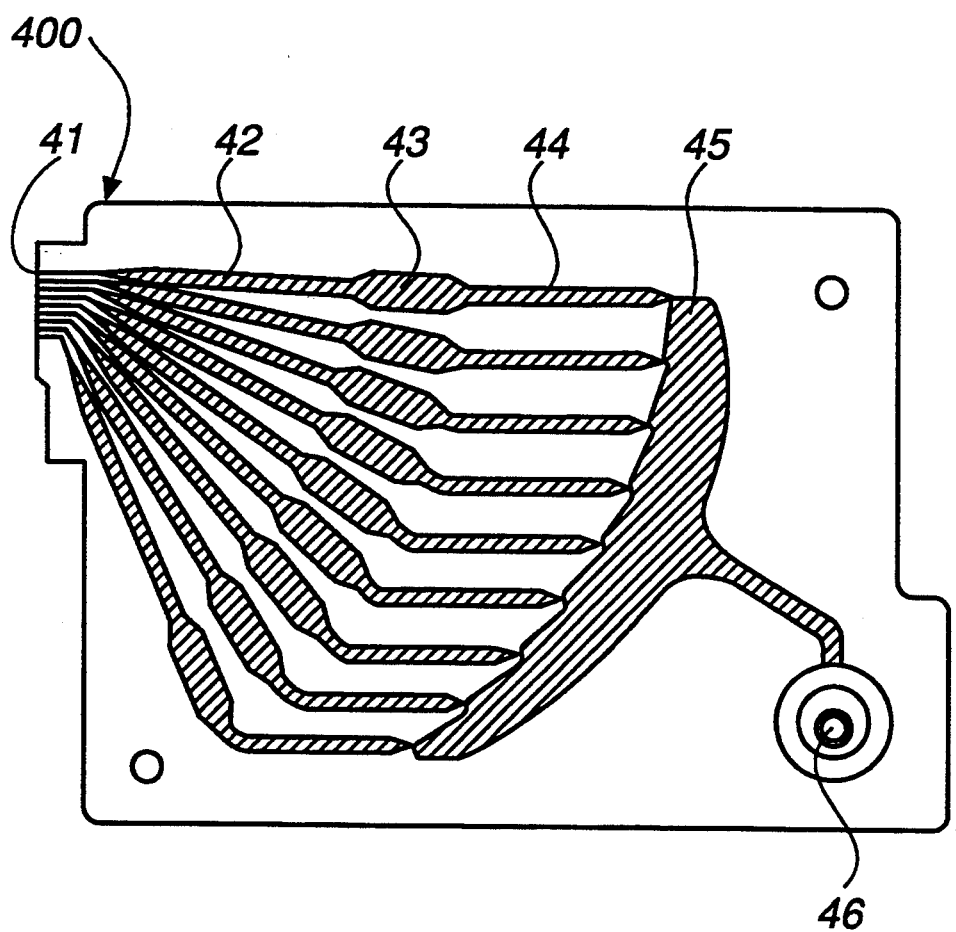
FIG. 4 is a cross-sectional view of the recording head of FIG. 1 depicting the ink being jetted out.

FIG. 4 illustrates the operation of recording head 40 in accordance with the first example. Recording head 400 has substantially the same structure as print head 100. As such elements 40–48 correspond to elements 10–18, respectively. As shown in FIG. 4, during the course of jetting out ink drops there through, in which ink feed mouth 46, common ink chambers 45, ink flow pathways 44 on the feed side, pressure chambers 43, ink flow pathways 42 on the nozzle side and nozzle orifices 41 were all completely filled with the ink with no invasion of bubbles therein. Accordingly, printing operations were effected well, without yielding any missing dots. In other words the printed characters were properly formed without distortion and deformation.

Figure 5:
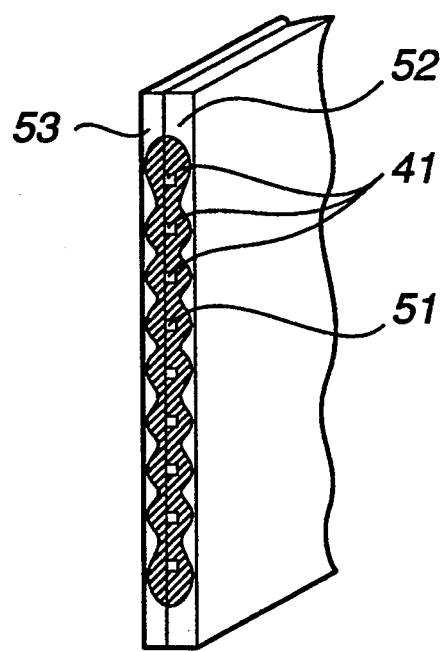
FIG. 5 is a partial perspective, front view of the recording head of FIG. 1.
Figure 6:
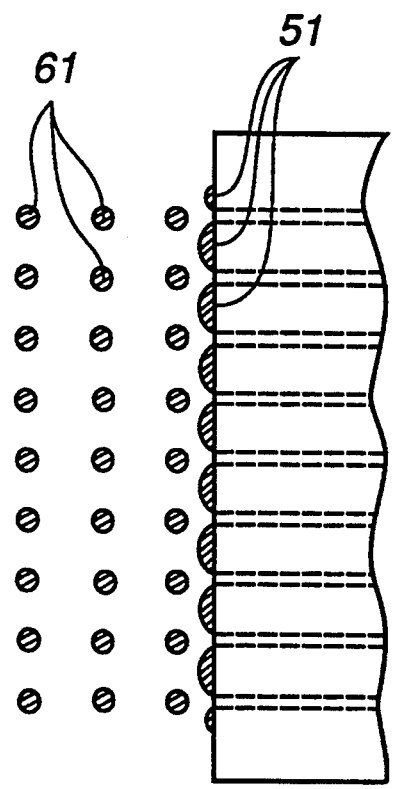
FIG. 6 is a side view of the recording head of FIG. 1 in which ink drops are being jetted out.

FIG. 5 is a partial perspective front view of the above-mentioned recording head 400 illustrating side 52 of first base 40 and side 53 of second base 48; and FIG. 6 is a side view of the recording head through which ink drops 61 are being jetted out. A shown therein, ink 51 has wetted or has adhered to the peripheral portion of nozzle orifices 41.

Since ink 51 uniformly wetted the peripheral portion of the nozzle orifice 41, as shown in FIG. 5, ink drops 61 were jetted out to fly vertically to the sides 52 and 53 of the first and second bases, respectively, as shown in FIG. 6. Therefore, the recording medium was printed with the ink in the intended position, and the quality of the printed letters was good.

Using the ink of the present example, printing was effected on neutral paper PPC (produced by Fuji Xerox Co., Ltd.), acidic paper for registration (produced by Dai-Showa Paper Mfg. Co., Ltd.), 45 kg-weight high-quality paper (produced by Jujo Paper Co., Ltd.), and regenerated paper "Yamayuri (trade name)" (produced by Honshu Paper Co., Ltd.), whereupon the time needed during the course from penetration of the ink into the paper to drying of the penetrated ink thereon was observed with the naked eye to the result of one second or less in every case. Thus, in accordance with the present invention, the ink drying time is extremely short irrespective of the characteristics of the type of paper tested.

Next, the print density of the printed papers was measured with a densitometer (Print Contrast Meter, manufactured by Macbeth Co.). A filter having a visible ray-sensitive characteristic to show the maximum transmittance at about 550 nm was inserted into the densitometer and the reflectivity of the printed dots was measured. Although the reflectivity somewhat varied depending upon the recording media (printing paper), the average reflectivity measured was 8%. From that value, the print density was calculated to be 1.1 as an optical reflective density OD value. In view of the OD value of being 1.1 to the filter, the printed dots gave sufficient black appearance when seen with the naked eye.

In addition, the printed papers were dipped into a static water for one hour, whereupon it was determined if any bleeding of the ink occurred. In this example, the bleeding was only slight. The print density of each of the dipped papers was again measured with the above-mentioned densitometer, having the visible ray filter as inserted therein, to the result that the mean reflectivity was 10%. From this, the OD value was calculated to be 1.0.

Next, the printed papers were exposed to the sun light for one month to check the degree of the decrease of the print density, if any. As a result, the print density in all cases remained substantially the same. The OD value of the printed papers after exposure under the condition was an average of 1.06. Thus, using the water-soluble ink and the ink jet printer of the present invention, printed papers having excellent water-proofness and light fastness are obtained.

The flow pathways of the above-mentioned recording head were then filled with the water-soluble ink and the head was put in a thermal test chamber or oven at 50° C. for 30 days. After taken out therefrom, the head was allowed to stand at room temperature for one day. After the operation, all the ink was sufficiently discharged from the ink flow pathways of the recording head by means of, for example, a pump. The ink was jetted out from the head in the manner mentioned above. As a result, the flying ink drops were stable, similar to that before the treatment. From this example, it is understood that the ink in the flow pathways in the recording head hardly vaporized during the treatment and that the ink formed no solid precipitates during this process.

Further testing of the ink was conducted. More specifically, one sample of the water-soluble ink was put in a hermetically sealed glass laboratory bottle and stored at 70° C. for 6 months. Another sample was placed in a similar bottle and was stored in a freezer for 6 months. After the storage of each sample, the liquid temperature of the ink was returned to room temperature. It was observed that the physical properties of the ink, such as viscosity and surface tension, did not substantially vary and the ink formed no solid precipitates. Thus, the storage stability of the ink under high temperature or low temperature conditions is good for a long period of time.

A further test was conducted in which the water-soluble ink was put in a glass laboratory bottle along with polysulfone, polycarbonate, polyether sulfone and polyacetal. The bottle containing the mixture was hermetically sealed and stored in an oven at 80° C. for 2 months. After the two months, the surface condition of the respective plastics was observed and revealed that the surfaces of the plastics were not roughened. From this observation, the inventors concluded that the water-soluble ink of the present invention, though containing a surfactant, does not roughen the surface of plastic materials.

COMPARATIVE EXAMPLE 1

The following components were blended to produce a water-soluble ink, in the same manner as in Example 1. The ink was de-foamed in the same manner as in Example 1; however, the ink formed bubbles and a half of the ink was unusable due to bubbling. Thus, the productability of the ink was low.

TABLE 2

Colorant:
Dye having a chemical structure of the following formula: 5.0 wt. %

[chemical structure diagram]

Penetrating Agent:
Polyoxyethylene nonylphenyl ether surfactant  5.0 wt. %
Antiseptic:
Compound having a chemical structure of the following formula: 0.2 wt. %

[chemical structure diagram]

Solvent:
Polyethylene glycol  10.0 wt. %
Water  79.8 wt. %

The water-soluble ink that remained without bubbling was fed to the recording head of Example 1, through which ink drops were jetted out. The profile of the recording head and the driving condition of it were the same as those in Example 1.

Figure 11:
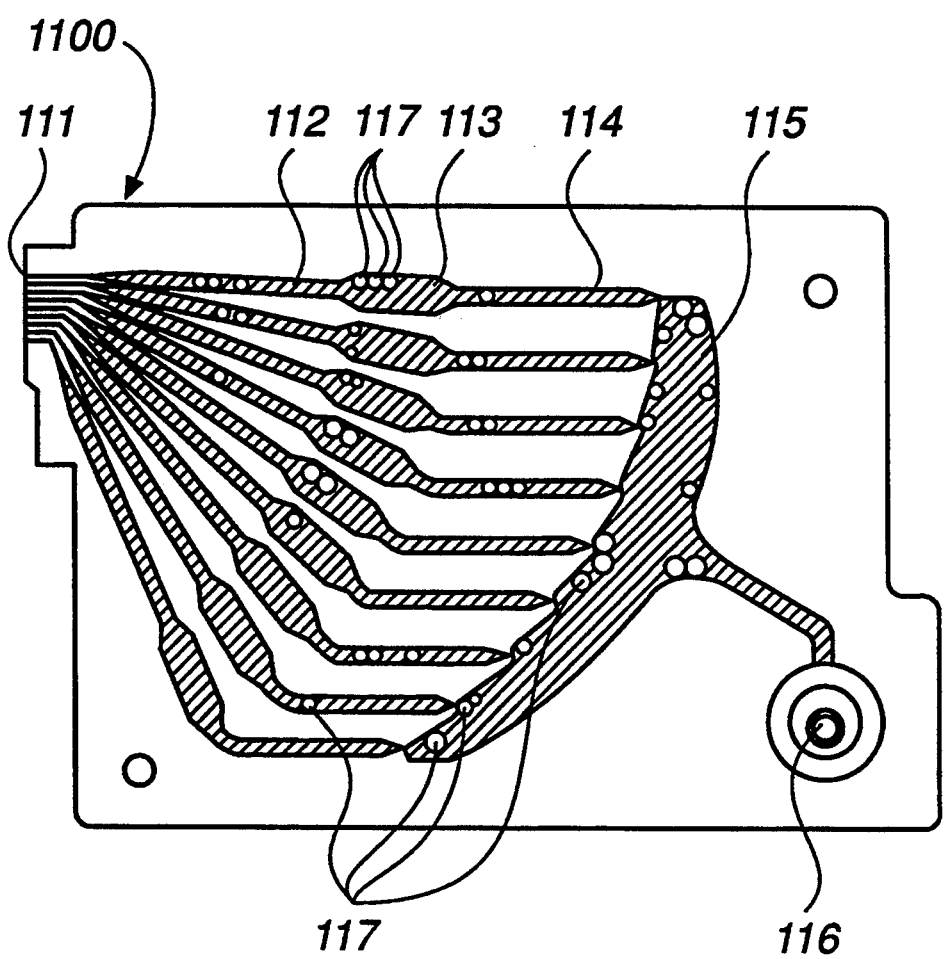
FIG. 11 is a cross-sectional view of a conventional recording head in which ink bubbles are formed.

FIG. 11 is a perspective view of the recording head 1100, from which ink drops of Comparative Example 1 are shown being jetted out. Recording head 1100 has a structure which is substantially similar to print head 100. As such elements 111–116 correspond to elements 11–16, respectively and no further explanation is required. As shown in FIG. 11, in this example, bubbles 117 invaded into the ink feed mouth 116, the common ink chambers 115, the ink flow pathways 114 on the feed side, the pressure chambers 113 and the ink flow pathways 112 on the nozzle side. The size of the bubbles were approximately from 0.05 to 0.1 mm in diameter.

The reason of bubbling of the ink is because the above-mentioned water-soluble dye, which is a colorant of the ink, and the above-mentioned surfactant, which is a penetrating agent thereof, have a bubbling property. Additionally, the other components of the ink do not have a de-foaming effect so that the ink is bubbled when it was fed into the recording head via, for example, a pump.

Even if an electric voltage is imparted to the piezoelectric elements under the condition of having bubbles in the pressure chambers 113 so as to bend the element to reduce the volume of the pressure chambers 113, the bubbles 117 tend to absorb the capacity to be reduced, so that the ink could not be effectively jetted out through recording head 1100. This results in selected orifices 111 not ejecting ink, causing missing dots on the printed media. As a result, printed characters were misformed and deformed rendering such difficult to read or even unreadable.

Next, the water-soluble ink was put in a similar glass laboratory bottle as that employed in Example 1, along with polysulfone, polycarbonate, polyether sulfone and polyacetal. The bottle was hermetically sealed and stored in an oven at 80° C. for 2 months. Then, the surface conditions of the respective plastics were checked and revealed that the polycarbonate and polyacetal whitened and exhibited a roughened surface.

EXAMPLE 2

The following components were blended and formed into a water-soluble ink in a similar manner as in Example 1.

TABLE 3

Colorant
Dye having a chemical structure of the following formula:
0.1 wt. %

$$H_2N-\underset{}{\bigcirc}\overset{NH_2}{-}N=N-\underset{}{\bigcirc}\overset{CH_3}{-}\underset{NaO_3S}{\bigcirc}\overset{CH_3}{-}N=N-\underset{}{\bigcirc\bigcirc}\overset{HO\ NH_2}{\underset{SO_3Na}{}}$$

Dye having a chemical structure of the following formula:
5.0 wt. %

$$NaO_3S-\bigcirc-N=N-\underset{\underset{SO_3Na}{\bigcirc}}{\bigcirc}-N=N-\underset{NaO_3S}{\bigcirc\bigcirc}\overset{OH}{\underset{SO_3Na}{\phantom{-}}}\overset{NH_2}{\phantom{-}}$$

Penetrating Agent:
Surfactant having a chemical structure of the following formula: 0.1 wt. %

$$CH_3-\underset{}{\overset{CH_3}{\underset{|}{CH}}}-CH_2-\underset{\underset{HO}{|}}{\overset{CH_3}{\underset{|}{C}}}-C\equiv C-\underset{\underset{OH}{|}}{\overset{CH_3}{\underset{|}{C}}}-CH_2-\underset{}{\overset{CH_3}{\underset{|}{CH}}}-CH_3$$

Solvent:
Triethylene glycol 15.0 wt. %
Water 79.8 wt. %

Figure 7:
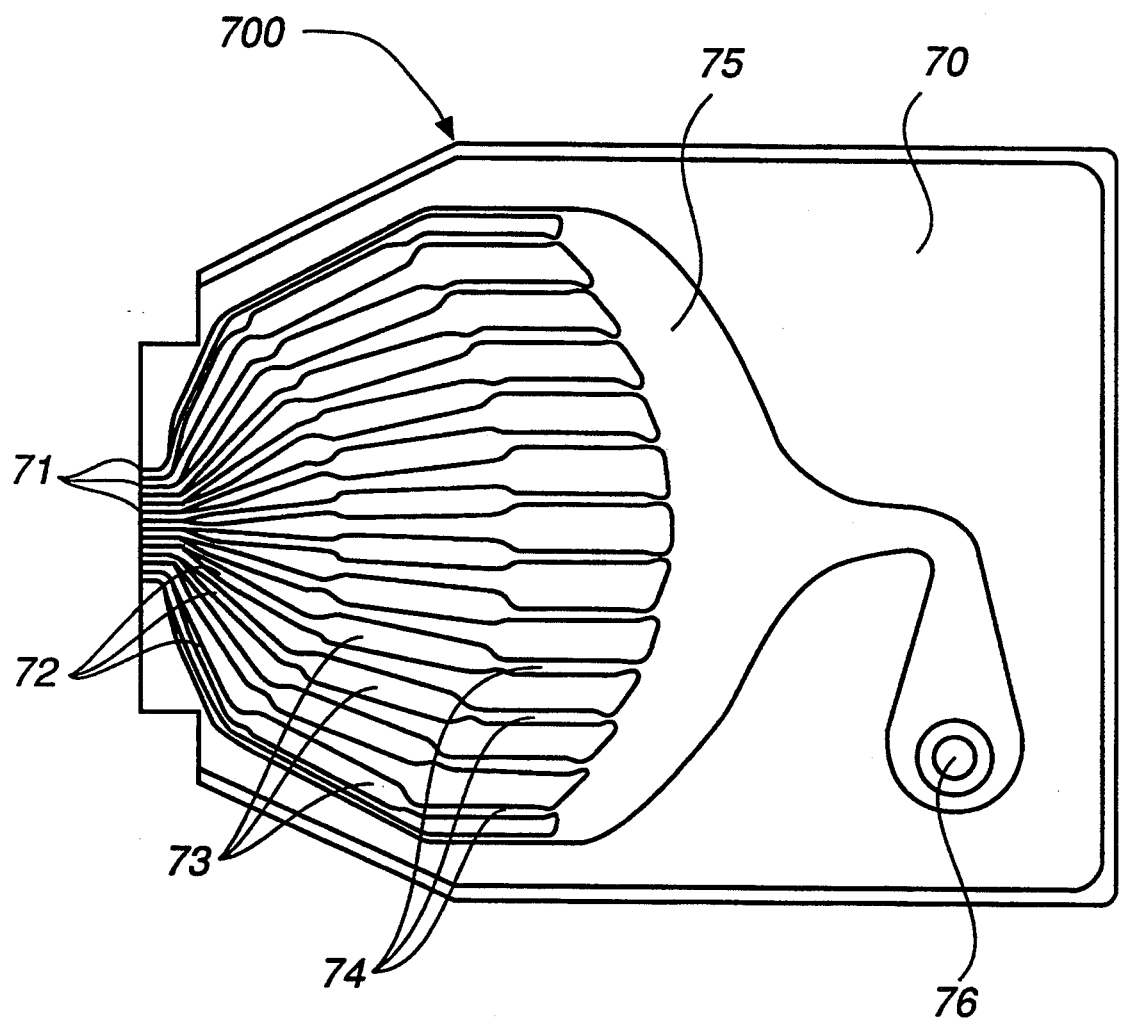
FIG. 7 is a cross-sectional view of a first base of a recording head in accordance with a second embodiment of the present invention.

FIG. 7 is a cross-sectional view of showing the first base 70 of the recording head 700 of the present invention as employed for printing with the water-soluble ink. Recording head 700 is similar to recording head 100. While print head 700 contains three more orifices and corresponding pathways and chambers, elements 71–78 correspond to elements 11–18, respectively. As such, no further explanation of elements 71–78 is deemed necessary. It is noted in print head 700 that each of the pathways 74 have the same length and each of the pathways 72 also have the same length. In this example, the water-soluble ink was fed into the ink jet printer of the present invention having the recording head composed of first base 70 and second base 78 composed of polysulfone of a polysulfone sheet. Ink drops were jetted out through the head. The profile of the nozzle orifice 71 of the recording head is preferably rectangular, having a dimension of 37 μm (width)×26 μm (height). The number of the nozzle orifices is 12 having a nozzle pitch of 282 μm. In this example, the driving power of the piezoelectric element was 33 V at a frequency of 2.2 kHz at room temperature.

Figure 8:
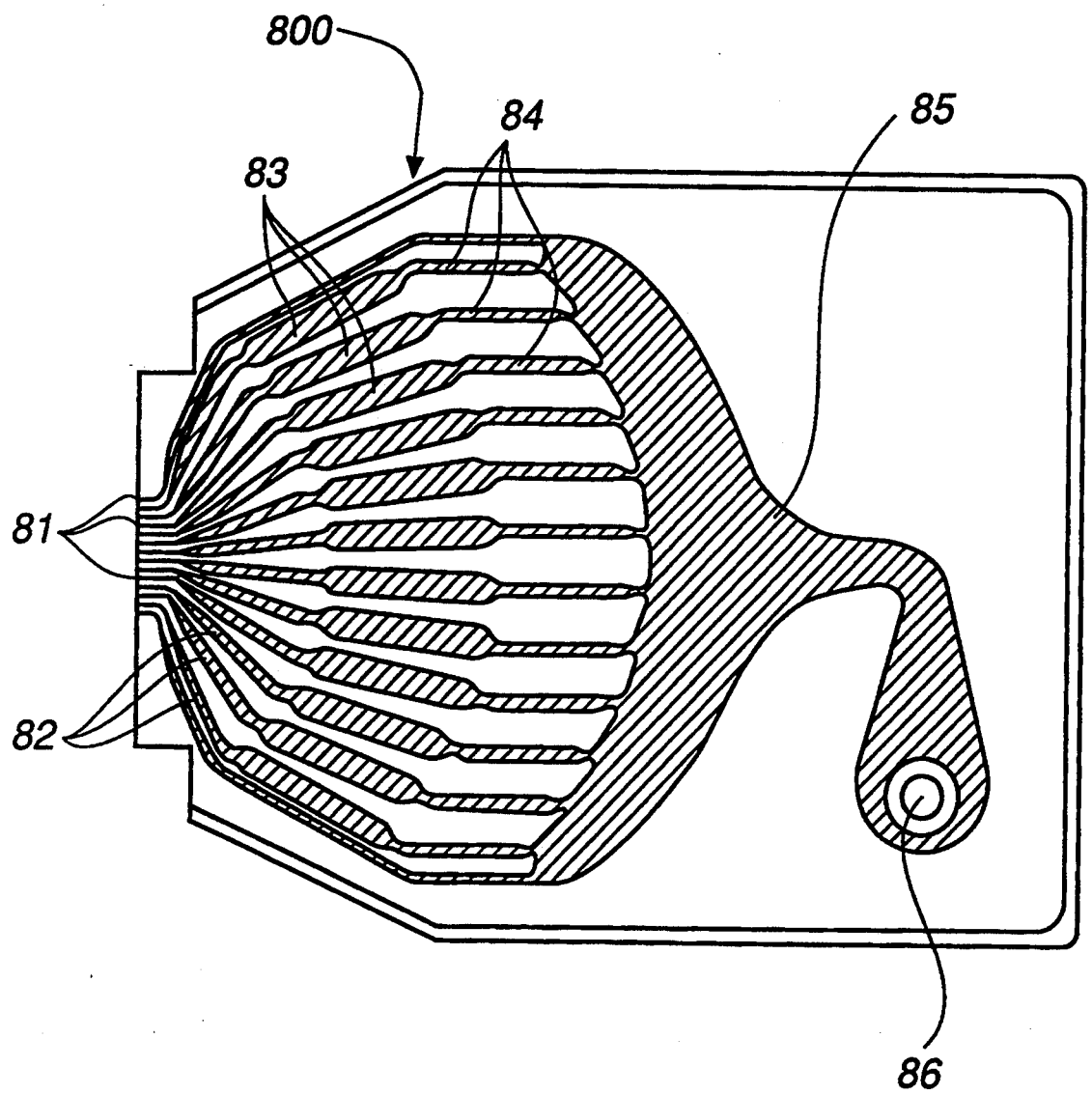
FIG. 8 is a cross-sectional view of the recording head of FIG. 7 illustrating the ink drops being jetted out.

FIG. 8 is a cross-sectional view of recording head 800 of the present example during the course of jetting out ink drops there through. Recording head 800 is similar to recording head 700. Accordingly, elements 80–88 correspond to elements 70–78 of recording head 700. Each of the ink feed mouths 86, the common ink chambers 85, the ink flow pathways 84 on the feed side, the pressure chambers 83, the ink flow pathways 82 on the nozzle side and nozzle orifices 81 were completely filled with the ink with no invasion of bubbles therein. Accordingly, printing operations were effected well. That is, this example yielded no misformed or deformed characters.

Figure 9:
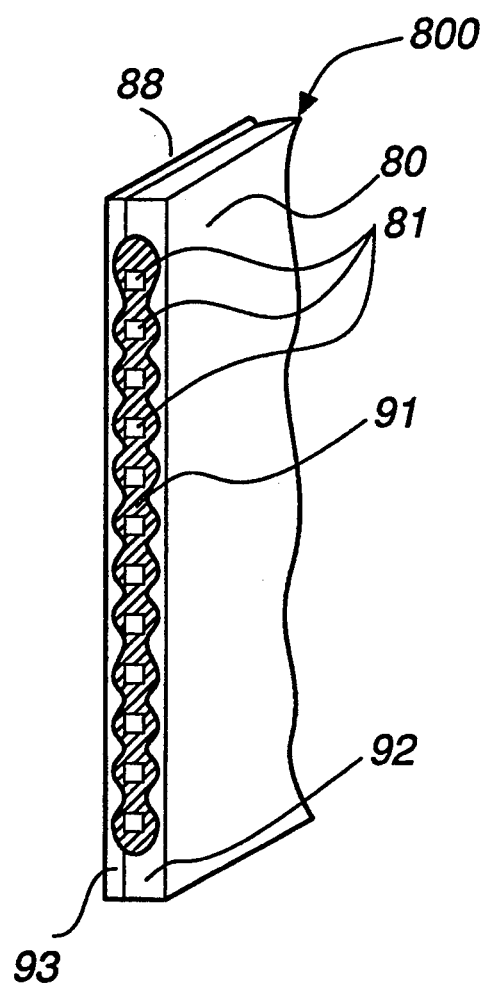
FIG. 9 is a partial perspective, front view of the recording head of FIG. 7 in which ink drops are being jetted out.
Figure 10:
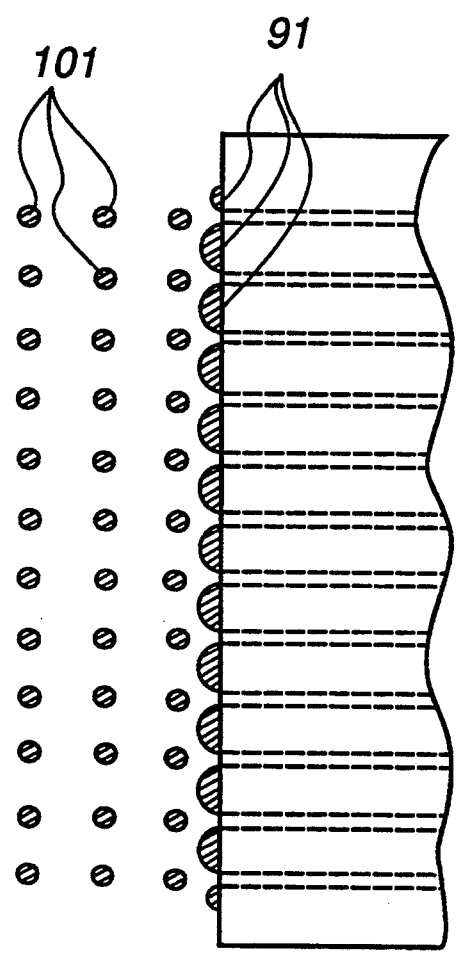
FIG. 10 is a side view of the recording head of FIG. 7 in which ink drops are being jetted out.

FIG. 9 is a partial perspective view of recording head 800; and FIG. 10 is a partial side view of the recording head through which the ink is being jetted out. As shown in that figure, ink 91 which has wetted or has adhered to the peripheral portion of the nozzle orifice formed from side 92 of first base 80, a side 93 of the second base 88, and flying ink drop 101 is wetted therefrom.

Since ink 91 uniformly wetted the peripheral portion of nozzle orifice 81, as shown in FIG. 9, ink drops 101 were jetted out to fly vertically to sides 92 and 93 of first and second bases, 80, 88 respectively, as shown in FIG. 10. Therefore, the recording medium was printed with the ink in the intended position, and the quality of the printed letters was good.

Using the ink and the recording head of the present example, printing was effected on various papers of those used in Example 1, whereupon the time needed during the course from penetration of the ink into the paper to drying of the penetrated ink thereon was observed with the naked eye to the result of one second or less in every case.

Next, the print density of the printed papers was measured with the above-mentioned densitometer. As a result, the reflectivity through the visible ray filter of showing the maximum transmittance at about 550 nm was 7% as an average. From the value, the print density was calculated to be 1.15 as an optical reflective density OD value. In view of the OD value of being 1.15 to the filter, the printed dots provide sufficient black appearance when seen with the naked eye.

In addition, the printed papers were dipped in a static water for one hour, whereupon it was determined whether any bleeding occurred. As a result, the bleeding was only slight. The print density of each of the dipped papers was again measured with the same densitometer which resulted in a mean reflectivity of 9%. From this, the OD value was calculated to be 1.0.

Next, the printed papers were exposed to the sun light for one month to determine the degree of the decrease of the print density, if any. In this example, it was observed the print density remained substantially the same, and the OD value of the printed papers after exposure under the condition was an average of 1.1.

Further, the jetting stability of the recording head after left for a long period of time and the long-time storage stability of the ink was tested in the same manner as in Example 1. As a result, stable jetting of the ink was possible after these tests, in which neither change of the physical properties of the ink nor formation of solid precipitates in the ink occurred.

COMPARATIVE EXAMPLE 2

The following components were blended to produce a water-soluble ink, in the same manner as in Example 1. The ink composition then was de-foamed in the same manner as in Example 1. However, like the case of Comparative Example 1, the ink formed bubbles and a half of the ink was unusable due to bubbling. Thus, the productability of the ink was low.

TABLE 4

Colorant:
Dye having a chemical structure of the following formula:
5.0 wt. %

TABLE 4-continued

Structure:
H2N—(C6H3-NH2)—N=N—(C6H3-CH3)—(C6H3-CH3)—N=N—(naphthalene with HO, NH2, NaO3S, SO3Na)

Solvent:
| | |
|---|---|
| Triethylene glycol | 15.0 wt. % |
| Water | 80.0 wt. % |

The water-soluble ink that remained without bubbling was fed to the recording head of Example 2, through which ink drops were jetted out. The profile of the recording head and the driving condition of it were the same as those in Example 2.

Since the above-mentioned water-soluble dye in the ink has a bubbling property and the other components of the ink do not have a de-foaming effect, the ink bubbled when it was fed into the head by means of, for example, a pump similar to Comparative Example 1. As a result, many bubbles invaded into the ink flow pathways and the pressure chamber so that jetting of ink drops from the head was impossible and the printed letters involved deformed and misform due in part to missing dots. Therefore, the printed letters tended to be unreadable.

Using this ink, various papers, as employed in Example 1, were printed with letters, whereupon the time needed for drying the printed ink was measured to be one minute or more. Thus, the ink used herein is disadvantageously not a quick-drying one. When the letters as printed with this ink were touched before the ink had dried, the letters would smear. Therefore, the printed letters could not be read correctly.

In addition, after the ink on the papers dried up, the printed papers were than dipped in a static water for one hour, whereupon it was determined, if any bleeding of the ink had occurred. As a result, almost all the ink dissolved out into the water, so that the print density was noticeably lowered and the printed letters were illegible.

Next, the printed papers were exposed to the sun light for one month to check the degree of the decrease, if any, of the print density. As a result, the OD value of the printed letters noticeably decreased to 0.65, as an average, from 1.25 before the exposure.

COMPARATIVE EXAMPLE 3

The following components were blended and formed into a water-soluble ink, in the same manner as in Example 1.

TABLE 5

Colorant:
Dye having a chemical structure of the following formula: at 4.0 wt. %

NaO3S—(C6H4)—N=N—(C6H3-OH, NaO3S)—N=N—(naphthalene with NH2, SO3Na, SO3Na)

Penetrating Agent:
Surfactant having a chemical structure of the following formula:
1.0 wt. %

TABLE 5-continued $$CH_3-CH(CH_3)-CH_2-C(CH_3)-C\equiv C-C(CH_3)-CH_2-CH(CH_3)-CH_3$$
$$HO-m(H_2C-H_2C-O) \quad (O-CH_2-CH_2)n-OH$$

where the molar number of ethylene oxide added (m + n) is from 6 to 40.

Solvent:
| | |
|---|---|
| Glycerin | 17.0 wt. % |
| Water | 78.0 wt. % |

The water-soluble ink was fed into the recording head of Example 1, from which ink drops were jetted out. The driving condition for the recording head was same as that in Example 1.

Figure 12:
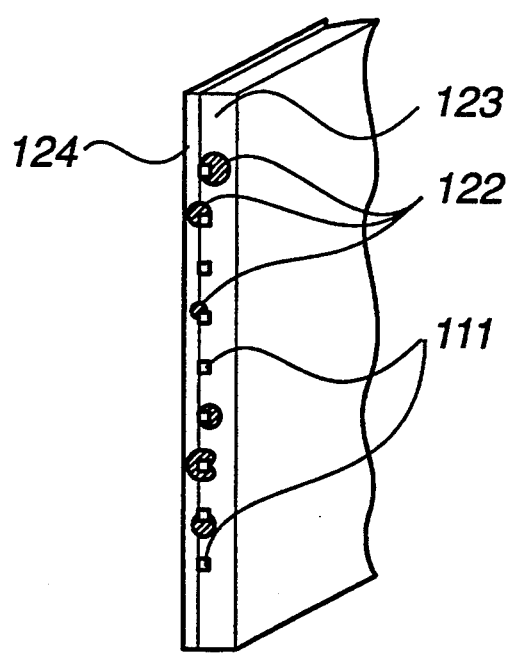
FIG. 12 a partial perspective view of the recording head in which ink drops are being jetted out in accordance with a conventional ink formulation.
Figure 13:
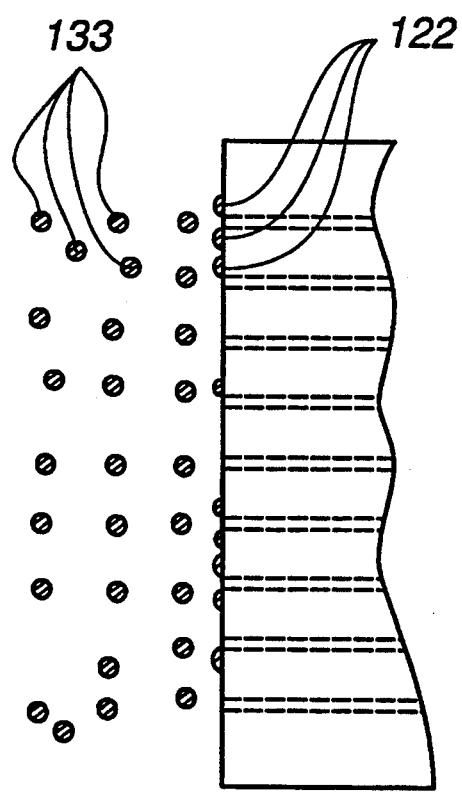
FIG. 13 is a cross-sectional view of the recording head using the conventional ink formulation.

FIG. 12 is a partial perspective view of the recording head of Comparative Example 3, from which ink drops were being jetted out; and FIG. 13 is a partial cross-sectional view of the recording head during jetting. In FIG. 12, nozzles 111 are formed from a first side 121 of first base 130 and slide 124 of second base 132. As shown therein, ink 122 is adhered to the peripheral portions of the nozzle orifices 111; and flying ink drops 133 are jetted out therefrom. Since the peripheral portion of the nozzle orifice 111 was not uniformly wetted with the ink 122, the jetted ink drops 133 were attracted by the ink as adhered to the peripheral portions of the nozzle orifices so that the ink drops deviate or meander from the vertical direction of the sides of the first and second bases, as shown in FIG. 13. Where the ink of Comparative Example 3 was used in printing with the above-mentioned recording head, the jetted ink drops meander and the printed letters tended to be illegible.

EXAMPLE 3

TABLE 6

Colorant:
Dye having a chemical structure of the following formula:
2.50 wt. %

H2N—(C6H3-NH2)—N=N—(C6H3-CH3)—(C6H3-CH3)—N=N—(naphthalene with HO, NH2, NaO3S, SO3Na)

Penetrating Agent:
Surfactant having a chemical structure of the following formula:
1.00 wt. %

$$CH_3-CH(CH_3)-CH_2-C(CH_3)-C\equiv C-C(CH_3)-CH_2-CH(CH_3)-CH_3$$
$$HO-m(H_2C-H_2C-O) \quad (O-CH_2-CH_2)n-OH$$

where the molar number of ethylene oxide added (m + n) is from 6 to 40.

Surfactant having a chemical structure of the following formula:
0.05 wt. %

$$CH_3-CH(CH_3)-CH_2-C(CH_3)-C\equiv C-C(CH_3)-CH_2-CH(CH_3)-CH_3$$
$$HO-m(H_2C-H_2C-O) \quad (O-CH_2-CH_2)n-OH$$

where the molar number of ethylene oxide added (m + n) is from 1 to 5.

Antiseptic:
Compound having a chemical structure of the following formula:
0.30 wt. %

(benzisothiazolinone structure: benzene fused ring with C(=O)-NH-S)

Solvent:
| | |
|---|---|
| Glycerin | 20.00 wt. % |
| Triethylene glycol | 2.00 wt. % |

TABLE 6-continued

| | |
|---|---|
| Water | 74.15 wt. % |

EXAMPLE 4
TABLE 7

Colorant:
Dye having a chemical structure of the following formula:
1.0 wt. %

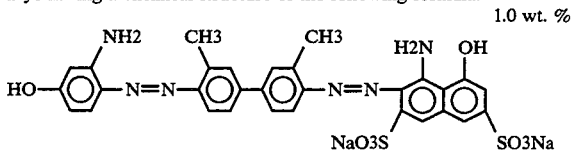

Penetrating Agent:
Surfactant having a chemical structure of the following formula:
0.1 wt. %

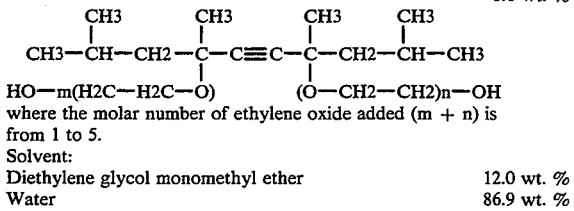

where the molar number of ethylene oxide added (m + n) is from 1 to 5.
Solvent:

| | |
|---|---|
| Diethylene glycol monomethyl ether | 12.0 wt. % |
| Water | 86.9 wt. % |

EXAMPLE 5
TABLE 8

Colorant:
Dye having a chemical structure of the following formula:
1.5 wt. %

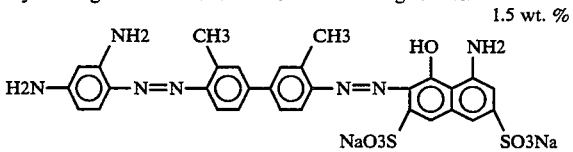

Penetrating Agent:
Surfactant having a chemical structure of the following formula:
0.1 wt. %

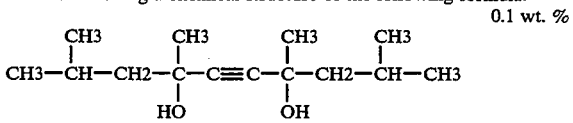

Surfactant having a chemical structure of the following formula:
0.5 wt. %

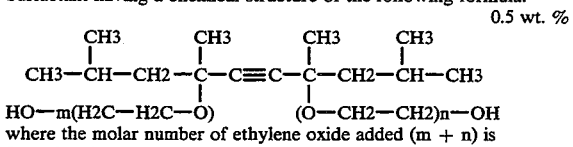

where the molar number of ethylene oxide added (m + n) is from 6 to 40.
Solvent:

| | |
|---|---|
| Polypropylene glycol | 18.0 wt. % |
| Water | 79.9 wt. % |

EXAMPLE 6
TABLE 9

Colorant:
Dye having a chemical structure of the following formula:
3.00 wt. %

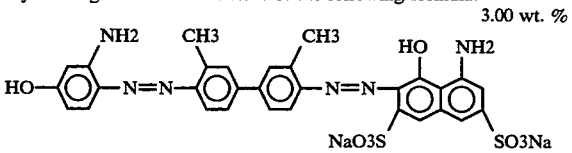

Penetrating Agent:

TABLE 9-continued

Surfactant having a chemical structure of the following formula:
0.05 wt. %

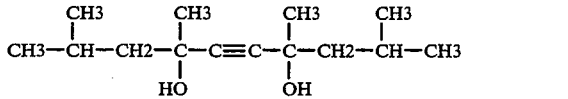

Surfactant having a chemical structure of the following formula:
0.10 wt. %

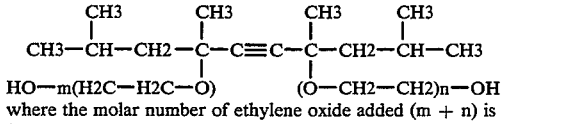

where the molar number of ethylene oxide added (m + n) is from 1 to 5.
Solvent:

| | |
|---|---|
| Ethylene glycol monoethyl ether | 25.00 wt. % |
| Water | 71.85 wt. % |

EXAMPLE 7
TABLE 10

Colorant:
Dye having a chemical structure of the following formula:
6.00 wt. %

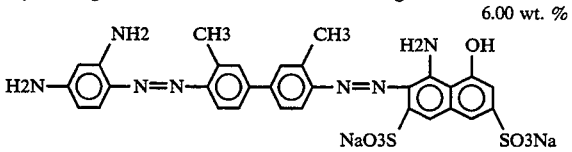

Penetating Agent:
Surfactant having a chemical structure of the following formula:
0.02 wt. %

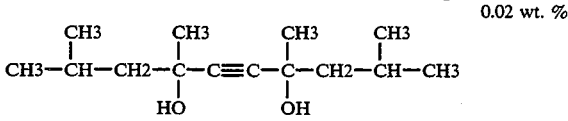

Surfactant having a chemical structure of the following formula:
2.00 wt. %

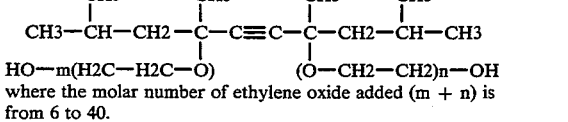

where the molar number of ethylene oxide added (m + n) is from 6 to 40.
Surfactant having a chemical structure of the following formula:
0.02 wt. %

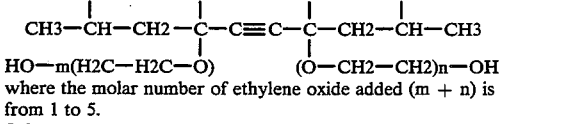

where the molar number of ethylene oxide added (m + n) is from 1 to 5.
Solvent:

| | |
|---|---|
| glycerin | 11.00 wt. % |
| Water | 80.96 wt. % |

The above-mentioned components were blended and well stirred for dissolution to prepare inks of Examples 3 to 7, in the same manner as in Example 1. Each ink thus prepared was filtered through a membrane filter having a pore size of 0.8 μm and then de-foamed in the same manner as in Example 1. Thus, various water-soluble inks were prepared.

Each water-soluble ink of Examples 3 to 7 was tested in the same manner as in Example 1, using the recording head of Example i under the same driving condition as in Example 1. The test results of Examples 1 and 2 and those of Comparative Examples 1 to 3 are shown in Table 11, along with the test results of Examples 3 to 7.

TABLE 11

| Test Items | Examples 1 | 2 | 3 | 4 | 5 | 6 | 7 | Comparative Examples 1 | 2 | 3 |
|---|---|---|---|---|---|---|---|---|---|---|
| Missing dots | O | O | O | O | O | O | O | X | X | — |
| Meandering of flying ink drops | O | O | O | O | O | O | O | — | — | X |
| Ink drying time | | | | | | | | | | |
| PPC paper | O | O | O | O | O | O | O | — | X | — |
| Register paper | O | O | O | O | O | O | O | — | X | — |
| High-quality paper | O | O | O | O | O | O | O | — | X | — |
| Regenerated paper | O | O | O | O | O | O | O | — | X | — |
| Print density | | | | | | | | | | |
| PPC paper | O | O | O | O | O | O | O | — | O | — |
| Register paper | O | O | O | O | O | O | O | — | O | — |
| High-quality paper | O | O | O | O | O | O | O | — | O | — |
| Regenerated paper | O | O | O | O | O | O | O | — | O | — |
| Waterproofness | O | O | O | O | O | O | O | — | X | — |
| Light fastness | O | O | O | O | O | O | O | — | X | — |
| High-temperature exposure of recording head | O | O | O | O | O | O | O | — | — | — |
| Long-time storage stability | O | O | O | O | O | O | O | — | — | — |
| Amount of remained ink | O | O | O | O | O | O | O | X | X | — |
| Applicability to plastics | O | O | O | O | O | O | O | X | — | — |

In Table 11, the criteria for evaluation of the test items are as follows:

(1) For missing dots;
"O" indicates no missing dots during printing, and
"X" indicates missing dots occurred at least once during printing.

(2) For meandering of flying ink drops;
"O" indicates no meandering of flying ink drops, and
"X" indicates meandering of flying ink drops.

(3) For ink drying time, the ink drying time in printing on PPC paper, register paper, high-quality paper and regenerated paper was measured.
"O" indicates that the drying time was less than several seconds, and
"X" indicates that the drying time was several seconds or more.

(4) For print density, the density of the letters as printed on PPC paper, register paper, high-quality paper and regenerated paper was measured with a densitometer, into which a visible ray-sensitive filter of showing the maximum transmittance at about 550 nm was inserted, to obtain the reflectivity R (%) of the printed dots. The OD value was obtained from the following equation:

OD value = -log (R/100).

"O" indicates that the OD value was 1.0 or more, and
"X" indicates that the OD value was less than 1.0

(5) For the result of the test of dipping the printed papers in water ("water-proofness" in the table), the printed PPC papers were dipped in a static water for one hour whereupon the degree of the bleeding, if any, of the printed letters was checked.
"O" indicates almost no bleeding, and
"X" indicates that the printed letters bled so that the letters were illegible.

(6) For the result of the test of exposing the printed papers to sun light ("light fastness" in the table), the printed PPC papers were exposed to the sun light for one month whereupon the degree of the decrease, if any, of the OD value of the printed letters was checked.
"O" indicates almost no decrease of the OD value of the printed letters, and
"X" indicates that the OD value of the printed letters decreased.

(7) For high-temperature exposure of recording head, the recording head as filled with the ink in the flow pathways was left in an oven at of 50° C. for 30 days.
"O" indicates that the ink could be discharged from the ink flow pathways of the recording head by a pump, after the test period, and
"X" indicates that the ink could not be discharged from the ink flow pathways of the recording head by a pump, after the test period.

(8) For long-time storage stability of ink, the ink was put in the glass sealed laboratory bottle of Example 1 and was stored in a freezer for 6 months or in an oven at 70° C. for 6 months.
"O" indicates that the physical properties of the ink did not change and the ink gave no solid precipitates after the test period, and
"X" indicates that either the physical properties of the ink changed or the ink gave solid precipitates after the test period.

(9) For applicability of ink to plastics, the ink was put in the glass laboratory bottle of Example 1 along with polysulfone, polycarbonate, polyether sulfone and polyacetal and sealed, and this was stored in an oven at 80° C. for 2 months.
"O" indicates that the plastics were not whitened and the surface of them was not toughened after the test period, and
"X" indicates that the plastics were whitened or the surface of them was roughened after the test period.

(10) For amount of remained ink after de-foaming treatment;
"O" indicates that the amount of the ink as remained after the de-foaming treatment was 90% or more,
"Δ" indicates that the amount of the ink as remained after the de-foaming treatment was within the range of from 60 to 90%, and
"X" indicates that the amount of the ink as remained after the de-foaming treatment was less than 60%.

In Table 11 above, "-" indicates that the ink was not tested. As shown in Table 11, the ink samples of Examples 1 to 7 provided good results with respect to all the test items of missing dots, meandering of flying ink drops, ink drying time, print density of printed letters, water-proofness, light fastness and applicability to plastics. In addition, even though the recording head having the ink therein was exposed to a high-temperature condition, the ink did not have significant amounts of solid precipitates. Therefore, such ink could well be discharged from the flow pathways of the head by a pump. Thus, stable jetting of the ink through the head was possible. Even though the ink was left in a high-temperature or low-temperature condition for a long period of time, the physical properties of the ink did not vary at all and the ink gave no solid precipitates. In addition, the amount of the ink as remained after the de-foaming treatment was sufficiently large.

However, using the inks of Comparative Examples 1 to 3, there were significant amounts of missing dots and the flying ink drops meandered or deviated during printing, these inks damaged the plastic materials comprising the print head, or a large portion of the ink was lost during the de-foaming treatment due to bubbling. The inks of these comparative examples could not attain the objectives of the present invention. Thus such inks were unsuitable for use in a plastic recording head. Table 12 shows the driving signals applied to the piezoelectric elements.

TABLE 12

| | Driving Frequency | Driving Voltage |
|---|---|---|
| Example | | |
| 1 | 2.0 kH$_z$ | 35 V |
| 2 | 2.2 kH$_z$ | 33 V |
| 3 | 2.0 kH$_z$ | 35 V |
| 4 | 2.0 kH$_z$ | 35 V |
| 5 | 2.0 kH$_z$ | 35 V |
| 6 | 2.0 kH$_z$ | 35 V |
| 7 | 2.0 kH$_z$ | 35 V |
| Comparative Example 1 | 2.0 kH$_z$ | 35 V |
| Comparative Example 2 | 2.2 kH$_z$ | 33 V |
| Comparative Example 3 | 2.0 kH$_z$ | 35 V |

The inventors have observed, consistent with the results discussed above, that the surfactant, having the chemical formula illustrated above, where $6 < n + m < 40$, is preferably no more than 10 wt. %. Otherwise, the surfactant does not dissolve in the water-soluble ink. As a result, the viscosity of the ink is increased and the print quality is unacceptable. On the other hand, if the surfactant is less than 0.1 wt. %, the surfactant does not effect the ink. Thus, the ink does not dry immediately after printing, which can lead to smearing and smudging. Similarly when $1 < n + m < 5$, if the surfactant is greater than 0.1 wt. % the surfactant does not dissolve in the ink, and if the surfactant is less than 0.01 wt. % than the surfactant does not effect the ink.

As mentioned above, the present invention has the following excellent advantages.

By incorporating a water-soluble dye having a structure of the following formula:

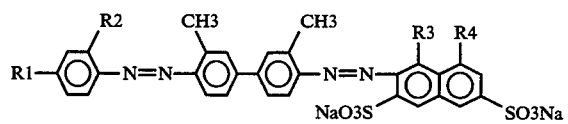

(where R$_1$ to R$_4$ each represents OH group or NH$_2$ group), as a colorant, into a water-soluble ink, the water-soluble ink acts to stably wet the ink flow pathways in a plastic recording head and also the peripheral portions of the nozzle orifices, due to the affinity of a dye for inner surface of the plastics head. Accordingly, even though the bases of the print head are made of a plastic, no bubbles invaded the ink flow pathways and the printed letters were free from missing dots. In addition, since the peripheral portions of the nozzle orifices were uniformly and stably wetted with the ink, the flying ink drops did not meander or deviate during the printing operation. Therefore, the ink of the present invention has an advantage of high-quality printed images in which a plastic head can be utilized.

Since the bases of the recording head are made of a plastic, manufacture of the head may be effected by molding or laser machining and thus, the manufacturing step may be shortened. Thus, the manufacture cost of the recording head and therefore the manufacture cost of the printer may be reduced advantageously.

As described above, incorporating an acetylene glycol surfactant having a chemical structure of the following formula:

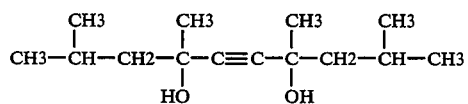

or an acetylene glycol-ethylene oxide adduct surfactant having a chemical structure of the following formula:

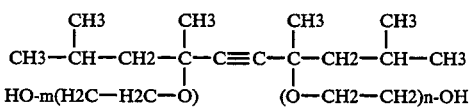

(where m and n each represents an integer of i or more) into a water-soluble ink, the surface tension of the ink is lowered so that the contact angle of the ink to any and every paper is reduced to less than 10° in most cases. Accordingly, the ink as adhered to paper by printing may immediately penetrate into the paper and is dried. This characteristic can be attained without the necessity of external drying techniques such as blowing hot air or the use of heat lamps. In addition, the printed letters are not blurred during the course from adhesion of the ink to paper to drying of the adhered ink on it.

Since the dye penetrates into paper and dyes the fibers of the paper, the water-proofness and light fastness of the printed letters are improved advantageously.

The water-soluble dye is proved having a chemical structure of the following formula:

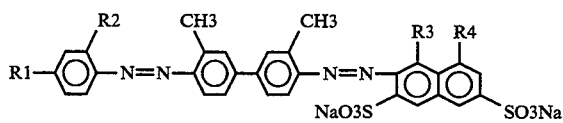

(where R$_1$ to R$_4$ each represents OH group or NH$_2$ group) of the present invention bubbles, when dissolved in water. The ink contains surfactants which lowers the surface tension of the solution containing them generally bubble with ease. However, since the above-mentioned surfactants to be employed in the present invention all have an improved de-foaming characters, they retard the bubbling property of the water-soluble dye of the present invention. Therefore, the ink of the present invention can be fed into the recording head without introduction of bubbles into the ink flow pathways and the pressure chamber of the head. This characteristic advantageously prevents failure of the jetting of ink drops from the head due to bubbles resulting in no missing dots during printing. In addition, even though the ink is subjected to de-foaming treatment, it does not bubble out during the treatment. Therefore, the yield of the ink of the present invention is advantageously high. Even though the above-mentioned surfactants are added to the ink of the present invention, the ink does not damage plastic materials. Therefore, in selection of plastic for the printer is not as critical as with conventional inks.

The ink jet printer and the water-soluble ink of the present invention both have advantages of all necessary requirements common to ordinary ink jet printers. That is, using the ink of the invention, the nozzle of the recording head is hardly clogged. In addition, the jetting stability of the ink of the invention through the head of the printer are advantageously excellent.

Furthermore, the water-soluble ink of the present invention has an additional advantage of high storage stability under high-temperature or low-temperature condition.

The ink in accordance with the present invention, can be advantageously used to print on various types of plain papers including recycled papers, which have rough characteristics. When used with these papers the ink containing the surfactants described above can readily penetrate into the paper and quickly dry to produce a high quality output.

These advantages are achieved from combination of a specific surfactant and a specific dye which causes a synergistic effect.

It should accordingly be understood that the preferred embodiments and specific examples of modifications thereto which have been described are for illustrative purposes only and are not intended to be construed as limitations on the scope of the present invention. Thus, while there have been shown and described and pointed out fundamental novel features of the invention as applied to preferred embodiments thereof, it will be further understood that various omissions and substitutions and changes in the form and details of the devices illustrated and described, and in their operation, may be made by those skilled in the art without departing from the spirit of the invention. It is the intention, therefore, to be limited only as indicated by the scope of the claims appended hereto.

We claim:

1. An aqueous ink composition comprising a water soluble dye having the chemical structure formula:

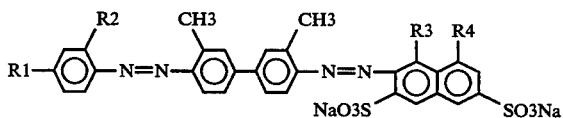

wherein $R_1$ to $R_4$ each represents an OH group and a $NH_2$ group in the range of about 0.1 wt. % to 10.0 wt. % of the aqueous ink, and at least one of a surfactant in the range of about 0.01 wt. % to 0.1 wt. % of the ink comprising an acetylene glycol surfactant having a chemical structure formula:

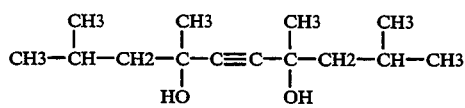

and an acetylene glycol-ethylene oxide adduct surfactant having a chemical formula,

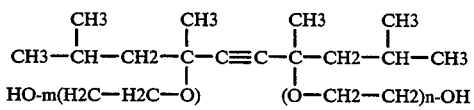

wherein m and n are each integers of at least 1.

2. An aqueous ink composition as in claim 1, which is useful for ink jet printing.

3. An aqueous ink composition as in claim 1, which is useful for an ink jet printer having a plastic body, portions of which are contacted by the aqueous ink composition.

4. An aqueous ink composition having a high wettability to plastic surfaces in contact with the ink comprising a water soluble dye having the chemical structure formula:

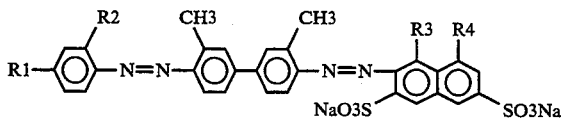

where $R_1$ to $R_4$ each represents one of an OH group and a $NH_2$ group and comprising an amount in the range of about 0.1 wt. % to 10.0 wt. % of the aqueous ink, and at least one of a surfactant comprising an acetylene glycol surfactant comprising an amount in the range of about 0.01 wt. % to 0.1 wt. % of the ink having a chemical structure formula:

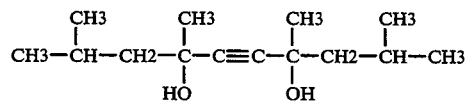

and an acetylene glycol-ethylene oxide adduct surfactant comprising an amount in the range of about 0.01 wt. % to 10 wt % of the aqueous ink having a chemical formula:

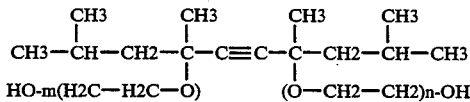

wherein a sum of m and n are each integers of at least 1.

5. An aqueous ink composition as in claim 4, which is useful for an ink jet printer having a plastic body including said plastic surfaces contacted by the aqueous ink composition.

6. An aqueous ink composition as in claim 4, wherein m and n are in the range from 1 to 5 inclusive.

7. An aqueous ink composition as in claim 6, wherein said adduct surfactant is in the range of 0.01 wt. % to 0.1 wt. %.

8. An ink jet printer comprising a plastic molded body having interior plastic surfaces including a plurality of ink ports each connected in a first direction to a first end respective of a plurality of respective ink pressure chambers and connected in a second direction to a respective one of a plurality of ink output nozzles, a common ink supply port connected a second end of said ink pressure chambers, an aqueous ink composition having a wetting property to said plastic surfaces, said aqueous ink comprising a water soluble dye having the chemical structure formula:

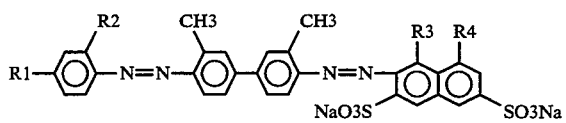

wherein $R_1$ to $R_4$, are one of an OH group and a $NH_2$ group in the range of about 0.1 wt. % to 10.0 wt. % of the aqueous ink, and at least one of a surfactant comprising an acetylene glycol surfactant comprising an amount in the range of about 0.01 wt. % to 0.1 wt. % of the aqueous ink having a chemical structure formula:

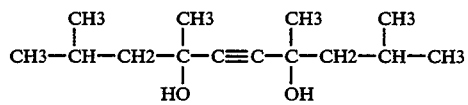

and an acetylene glycol-ethylene oxide adduct surfactant comprising an amount in the range of about 0.01 wt. % to 0.1 wt. % of the aqueous ink having a chemical structure formula:

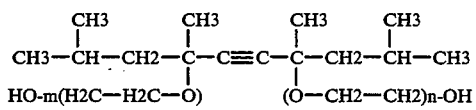

wherein a sum of m and n is in the range from 1 to 5 inclusive.

9. An aqueous ink composition comprising a water soluble dye having the chemical structure formula:

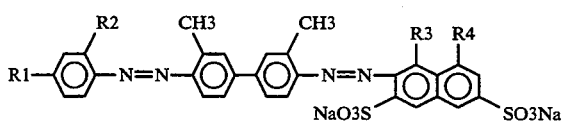

wherein $R_1$ to $R_4$, are one of an OH group and a $NH_2$ group in the range of about 0.1 wt. % to 10.0 wt % of the aqueous ink, and a first surfactant in the range of about 0.01 wt. % to 0.1 wt. % of the ink comprising an acetylene glycol surfactant having a chemical structure formula:

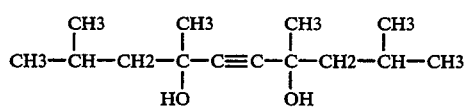

a second surfactant having at least one of a first portion in the range of about 0.01 wt. % to 0.1 wt. % of the aqueous ink comprising an acetylene glycol-ethylene oxide adduct surfactant having a chemical formula:

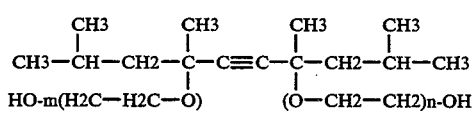

wherein a sum of m and n is in the range from 1 to 5, inclusive, and a second portion in the range of about 0.1 wt. % to 10 wt. % of the aqueous ink comprising acetylene glycol-ethylene oxide adduct surfactant having a chemical formula:

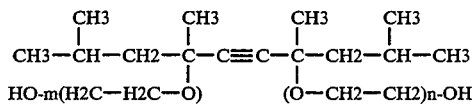

wherein a sum of m and n is in the range of 6 to 40, inclusive.

10. An aqueous ink composition having high wettability to plastic surfaces in contact with the ink comprising a water soluble dye having the chemical structure formula:

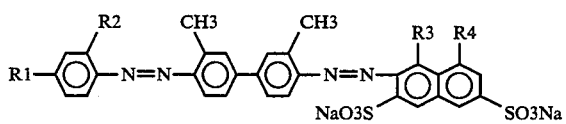

where $R_1$ to $R_4$ each represents one of an OH group and a $NH_2$ group and comprising an amount in the range of about 0.1 wt. % to 10 wt. % of the aqueous ink, and at least one of a surfactant comprising acetylene glycol surfactant comprising an amount in the range of about 0.01 wt. % to 0.1 wt. % of the aqueous ink having a chemical formula:

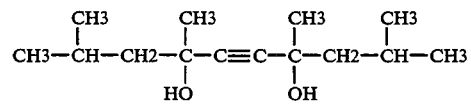

and an acetylene glycol-ethylene oxide adduct surfactant comprising an amount in the range of about 0.1 wt. % to 10 wt. % of the aqueous ink having a chemical formula:

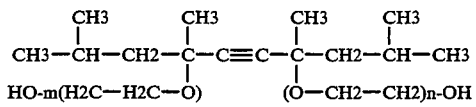

wherein a sum of m and n is in the range of 6 to 40, inclusive.

11. A method of producing an aqueous ink composition comprising the steps of providing a water soluble dye having the chemical structure formula:

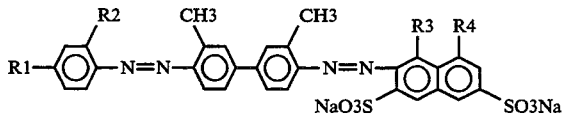

wherein $R_1$ to $R_4$ are one of an OH group and a $NH_2$ group in the range of about 0.1 wt. % to 10 wt. % of the aqueous ink, and adding to the aqueous ink at least one of the first surfactant in the range of about 0.01 wt. % to 0.1 wt. % of the ink comprising an acetylene glycol surfactant having a chemical structure formula:

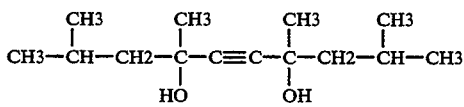

and a second surfactant having at least one of the first portion in the range of about 0.01 wt. % to 0.1 wt. % of the ink comprising an acetylene glycol-ethylene oxide adduct surfactant having a chemical structure formula:

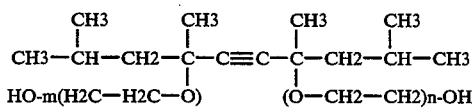

wherein a sum of m and n is in the range of 1 to 5 inclusive, and a second portion in the range of about 0.1 wt. % to 10 wt. % of the aqueous ink comprising an acetylene glycol-ethylene oxide adduct surfactant having a chemical structure formula:

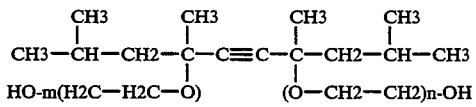

wherein a sum of m and n is in the range of 6 to 40 inclusive.

12. A method as in claim 11, which is useful for an ink jet printer having a plastic body including said plastic surfaces contacted by the aqueous ink composition.

13. A method of printing on a recording medium comprising the steps of, providing an ink jet printer comprising a plastic molded body having interior plastic surfaces including a plurality of ink ports each connected in a first direction to a first end of respective of a plurality of respective ink pressure chambers and connected in a second direction to a respective one of a plurality of ink output nozzles, a common ink supply port connected a second end of said ink pressure chambers, an aqueous ink composition having a wetting property to said plastic surfaces, said aqueous ink comprising a water soluble dye having the chemical structure formula:

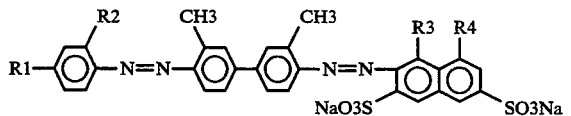

wherein $R_1$ to $R_4$ are one of an OH group and a $NH_2$ group in the range of about 0.1 wt. % to 10 wt. % of the aqueous ink, and at least one of a first surfactant in the range of about 0.01 wt. % to 0.1 wt. % of the aqueous ink comprising an acetylene glycol surfactant having a chemical structure formula:

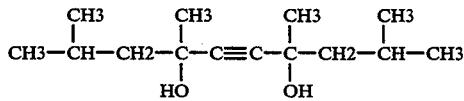

and a second surfactant having at lease one of a first portion in the range of about 0.01 wt. % to 0.1 wt. % of the aqueous ink comprising an acetylene glycol-ethylene oxide adduct surfactant having a chemical structure formula:

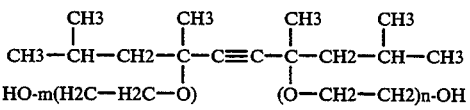

and wherein a sum of m and n is of in the range of 1 to 5 inclusive, and a second portion in the range of about 0.1 wt. % to 10 wt. % of the aqueous ink comprising an acetylene glycol-ethylene oxide adduct surfactant having a chemical structure formula:

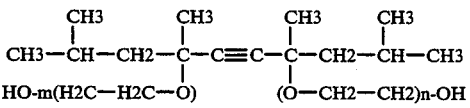

and wherein a sum of m and n is in the range of 6 to 40 inclusive; and ejecting the ink through the output nozzles toward the recording medium.

14. An ink jet printer comprising molded body of a plastic material comprising interior plastic surfaces including a plurality of ink ports each connected in a first direction to a first end respective of a plurality of respective ink pressure chambers and connected in a second direction to a respective one of a plurality of ink output nozzles, a common ink supply port connected a second end of said ink pressure chambers, an aqueous ink composition having a wetting property to said plastic surfaces, said aqueous ink comprising a water soluble dye having the chemical structure formula:

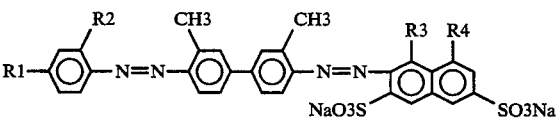

wherein $R_1$ to $R_4$, are one of an OH group and a $NH_2$ group, and at least one of a surfactant comprising an acetylene glycol surfactant having a chemical structure formula:

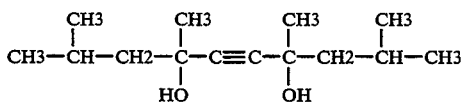

and an acetylene glycol-ethylene oxide adduct surfactant having a chemical structure formula:

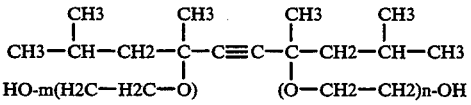

wherein a sum of m and n is in the range from 1 to 40 inclusive.

15. An ink jet printer according to claim 14, wherein said plastic material comprises a material selected from the group consisting of polysulfone, polycarbonate, polyether sulfone, polyallyl sulfone, and polyacetal.

* * * * *